United States Patent [19]
Ishizaki et al.

[11] Patent Number: 5,876,037
[45] Date of Patent: Mar. 2, 1999

[54] MAGNETIC FLUID SEALING DEVICE

[75] Inventors: Hirohisa Ishizaki, Yokaichiba; Sirou Tsuda, Asahi, both of Japan

[73] Assignee: Ferrotec Corporation, Tokyo, Japan

[21] Appl. No.: 751,824

[22] Filed: Nov. 19, 1996

[51] Int. Cl.$^6$ .................................................. F16J 15/40
[52] U.S. Cl. ........................................ 277/410; 277/302
[58] Field of Search ..................................... 277/410, 302

[56] References Cited

U.S. PATENT DOCUMENTS

| | | | |
|---|---|---|---|
| 4,357,024 | 11/1982 | Raj | 277/410 |
| 4,444,398 | 4/1984 | Black, Jr. et al. | 277/410 |
| 4,973,064 | 11/1990 | Hosaya | 277/410 |
| 5,009,436 | 4/1991 | Endo et al. | 277/410 |
| 5,118,118 | 6/1992 | Tadi et al. | 277/410 |
| 5,161,902 | 11/1992 | Fujii | 277/410 |
| 5,215,313 | 6/1993 | Yokouchi et al. | 277/410 |
| 5,267,737 | 12/1993 | Cossette et al. | 277/410 |

*Primary Examiner*—Daniel G. DePumpo
*Attorney, Agent, or Firm*—Armstrong, Westerman, Hattori, McLeland & Naughton

[57] ABSTRACT

A magnetic fluid sealing device for preventing magnetic fluid from flowing out or spattering under the influence of rotation of a rotatable shaft, thereby preventing contamination of the surroundings. The device includes a pole piece 1 formed with a step portion 13 whose front end surface 4 is disposed more inwardly than the proximal end surface, and the surface of the step portion 13 opposed to a magnetic body 6 serves as a barrier wall 10. Thereby, magnetic fluid 7 is prevented from flowing out or spattering into the surroundings.

7 Claims, 4 Drawing Sheets

5,876,037

MAGNETIC FLUID SEALING DEVICE

BACKGROUND OF THE INVENTION

1. Field of the Invention

This invention relates to a magnetic fluid sealing device used in hard disk drives and the like.

2. Description of the Related

Heretofore, a conventional magnetic fluid sealing device has been constructed as shown in FIG. 9. That is, as shown in FIG. 9, held between the inner surfaces of a pair of pole pieces 21 made of magnetic material in doughnut-shaped disk form is a doughnut-shaped magnet 22 having a greater inner diameter than that of the pole pieces, the assembly being fixed at its outer periphery to a housing 25, and a rotatable shaft 24 of magnetic material is inserted in the central hole, with magnetic fluid 26 held in the gaps defined between the rotatable shaft 24 and the front end surface of the pole pieces 21 opposed thereto.

In the magnetic fluid sealing device described above, however, the relatively high rotational speed of the rotatable shaft 24 throws the magnetic fluid 26 outwardly to decrease its amount or lower its life, or the magnetic fluid 26 flows out onto the outer surfaces of the pole pieces 21 to contaminate the surroundings.

SUMMARY OF THE INVENTION

The present invention has been accomplished to eliminate the above drawbacks and is intended to provide a magnetic fluid sealing device designed to prevent the magnetic fluid from flowing out to the surroundings, to thereby achieve prevention of contamination of surroundings and prolongation of the life.

Thus, a magnetic fluid sealing device is described in which a magnet 3 is held between the inner surfaces of a pair of plate-like pole pieces 1 and 2, the front end surface 4 of the pole piece 1 being opposed to a magnetic body 6, with magnetic fluid held between the pole piece 1 and the magnetic body 6 by a magnetic circuit formed by the magnet 3. The pole piece 1 is formed with a step portion 13, the step portion 13 being positioned such that the front end surface 4 of the pole piece 1 is disposed more inwardly than the proximal end surface of the pole piece 1, the surface of the step portion 13 opposed to the magnetic body 6 serving as a barrier wall 10.

Preferably the angle formed between the barrier wall 10 and the outer surface of the pole piece 1 is an arcuate angle.

Barrier wall 10 maybe replaced by an oil repellent wall 15.

The oil repellent wall 15 is preferably made of a material having a property such that the angle of contact of the magnetic fluid 7 therewith is greater than that with the pole piece 1.

The pole piece 1 maybe formed with a bent portion disposed in the vicinity of the oil repellent wall 15, and in the bent portion the front end surface 4 of the pole piece 1 is inwardly bent.

The pole piece 1 may have a cover 14 attached thereto for covering the magnetic fluid 7 which is held.

The cover 14 is preferably made of a material having a property such that the angle of contact therewith is greater than that with the pole piece 1.

Thus, flow-out of the magnetic fluid is prevented and, the pole piece, such spattering is prevented by the cover 14.

DESCRIPTION OF THE PREFERRED EMBODIMENTS

Several embodiments of the magnetic fluid sealing device of this invention will now be described with reference to the drawings. The following embodiments refer to preferred constructions to be applied to hard disk driving devices.

Figure 1:
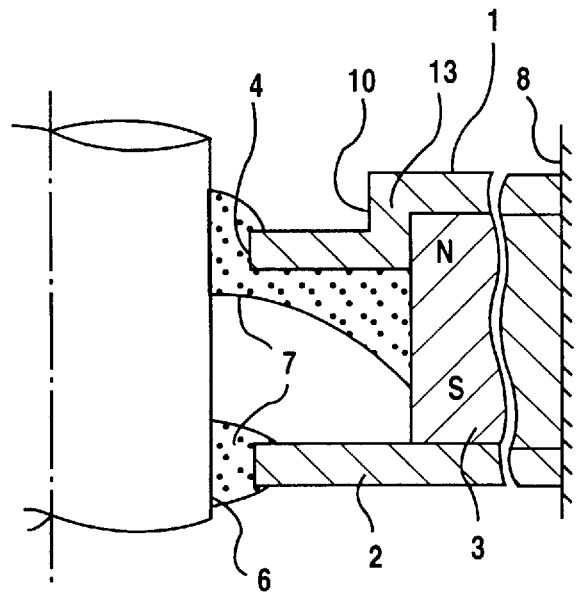
FIG. 1 is a partial sectional view of a first embodiment of a magnetic fluid sealing device according to the present invention.

In a first embodiment shown in FIG. 1, held between the inner surfaces of a pair of pole pieces 1 and 2 made of magnetic material in doughnut-shaped disk form is a doughnut-shaped magnet 3 having a greater inner diameter than that of the pole pieces, and, with their holes aligned with each other, these parts are bonded together. The portion of one pole piece 1 disposed closer to a rotatable shaft 6 is bent along the end surface of the magnet 3 first inwardly at right angles and then at right angles so that the front end surface 4 is parallel with the other pole piece 2, so as to form a step portion 13. In this case, the surface of the step portion 13 opposed to the rotatable shaft 6 forms a barrier wall 10. Further, the outer peripheries of the pole pieces 1, 2 and magnet 3 are fixed to a housing 8, while the rotatable shaft 6 made of magnetic material is inserted in the central hole, with the front end surfaces 4 and 5 of the pole pieces 1 and 2 being opposed to the rotatable shaft 6.

Magnetic fluid 7 is filled between the front end surfaces 4, 5 of the pole pieces 1, 2 and the rotatable shaft 6. In this case, the magnet 3 has been axially magnetized as indicated by N and S, and a magnetic circuit is defined by the magnet 3, two pole pieces 1, 2, and rotatable shaft 6, whereby the magnetic fluid 7 filled in, the gap is retained.

In the first embodiment described above, even if the magnetic fluid 7 tries to flow out to diffuse over the outer lateral surface of the pole piece 1 toward the proximal end under the influence of high speed relative rotation of the rotatable shaft 6, the presence of the barrier wall 13 in the way makes it difficult for flow-out and diffusion to occur, thereby achieving prevention of contamination of surroundings and prolongation of the life due to a decrease in the retained amount of the magnetic fluid 7.

Figure 2:
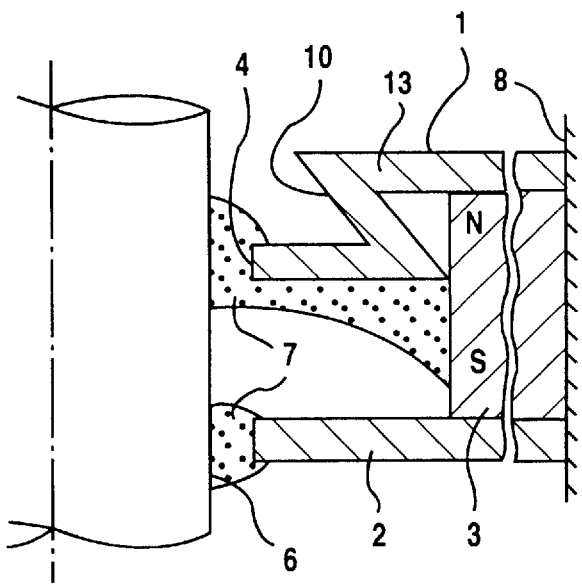
FIG. 2 is a partial sectional view of a second embodiment of a magnetic fluid sealing device according to the present invention.

A second embodiment shown in FIG. 2 is the same as in the first embodiment except that the angle formed between the barrier wall 10, i.e., the surface of the step portion 13 opposed to the rotatable shaft 6, and the outer surface of the pole piece 1 disposed closer to the proximal end than is the step portion 13 is an arcuate angle. In this case, since the barrier wall 10 is disposed to overhang obliquely from inside to outside, the magnetic fluid 7 held at the front end surface 4 of the pole piece 1, the flow-out and diffusion of the magnetic fluid 7 can be reliably prevented.

Figure 3:
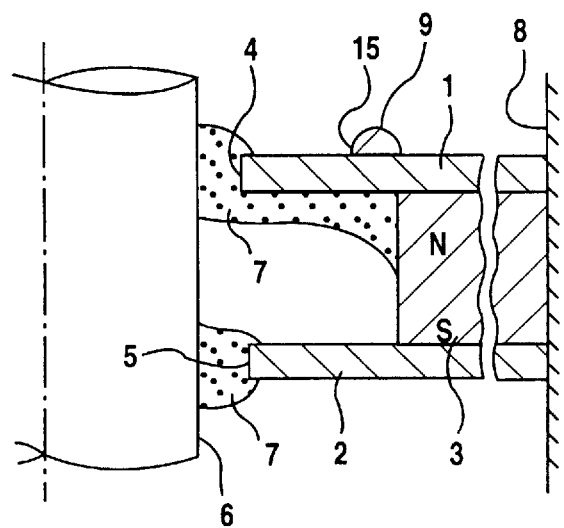
FIG. 3 is a partial sectional view of a third embodiment of a magnetic fluid sealing device according to the present invention.

In a third embodiment shown in FIG. 3, held between the inner surfaces of a pair of pole pieces 1 and 2 made of magnetic material in doughnut-shaped disk form is a doughnut-shaped magnet 3 of larger inner diameter than that of said pole pieces, and, with their holes aligned with each other, these parts are fixed at their peripheries to housing 8. A rotatable shaft 6 made of magnetic material is inserted in the central hole, with the front end surfaces 4 and 5 of the pole pieces 1 and 2 being opposed to the rotatable shaft 6.

In the above arrangement, a projection 9 of semicircular cross-section is annularly formed on the outer surface of one pole piece 1 at a position opposed to the inner end of the magnet 3. The projection 9 is made of a material having a property such that the angle of contact of the magnetic fluid therewith is greater than that with the pole piece 1. Such materials include ultraviolet setting type (modified acrylate type) adhesive agents, epoxy adhesive agents and the like adhesive agents, nylon and other thermoplastic resins, and metals. Further, the methods of forming the projection 9 include application by screen printing in the case of said adhesive agent, and ultrasonic fusion in the case of thermoplastic resin.

In the above construction, the surface of the projection 9 opposed to the rotatable shaft 6 serves as an oil repellent wall 15. Magnetic fluid 7 is filled between the front end surfaces 4, 5 of the pole pieces 1, 2 and the rotatable shaft 6. In this case, the magnet 3 has been axially magnetized as indicated by N and S, and a magnetic circuit is defined by the magnet 3, two pole piece 1, 2, and rotatable shaft 6, whereby the magnetic fluid 7 filled in the gap is retained.

Since said projection 9 is made of a material having a property such that the angle of contact of the magnetic fluid therewith is greater than that with the pole piece 1, the oil repellence on the oil repellent wall 15 against the magnetic fluid 7 is greater. Therefore, even if the magnetic fluid 7 tries to climb over the oil repellent wall 15 to flow out to diffuse over the outer surface of the pole piece 1 toward the proximal end, it is difficult for the magnetic fluid to do so. Thus, flow-out and diffusion hardly occur, thereby achieving prevention of contamination of surroundings and the reduction of the life due to a decrease in the retained amount of the magnetic fluid 7.

Figure 4:
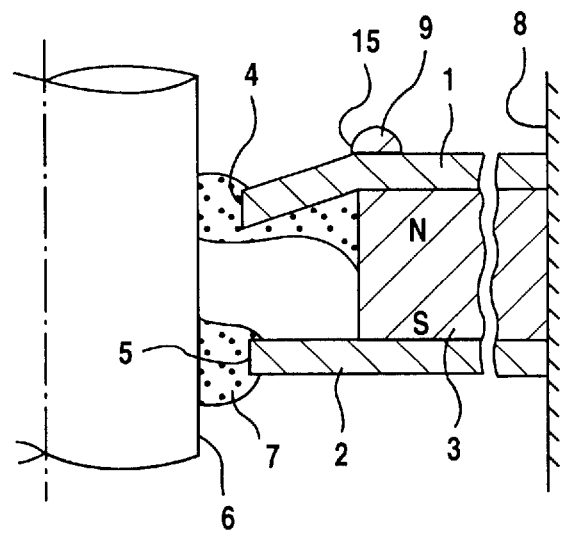
FIG. 4 is a partial sectional view of a fourth embodiment of a magnetic fluid sealing device according to the present invention.

A fourth embodiment shown in FIG. 4 is constructed such that in the pole piece 1 of the embodiment, the portion of the pole piece 1 extending from the projection 9 toward the rotatable shaft is inwardly obliquely bent to form a bent portion. According to this embodiment, the flow-out and diffusion of the magnetic fluid 7 can be more reliably prevented because of the presence of the bent portion.

Figure 5:
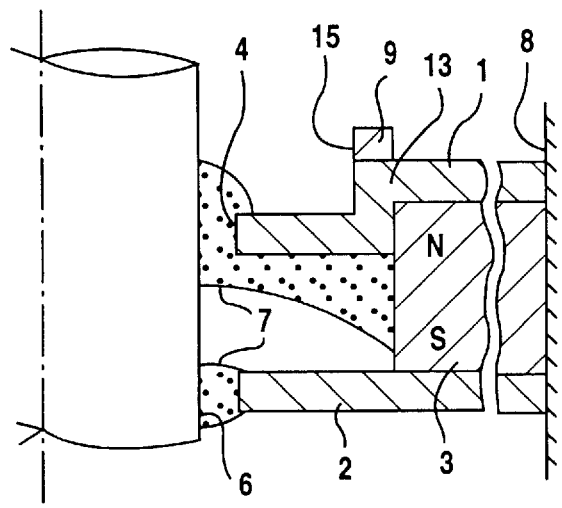
FIG. 5 is a partial sectional view of a fifth embodiment of a magnetic fluid sealing device according to the present invention.

In a fifth embodiment shown in FIG. 5, the outer surface of the pole piece is formed with a projection 9 of rectangular cross-section. The surface of this projection 9 opposed to the rotatable shaft 6 serves as an oil repellent wall 15 which is continuous with the barrier wall 10. In this embodiment, the cooperation between the barrier wall 10 and and the oil repellent wall 15 continuous therewith provides a reliable flow-out prevention effect. In addition, the material of which the projection 9 is made is the same as in the third embodiment.

Figure 6:
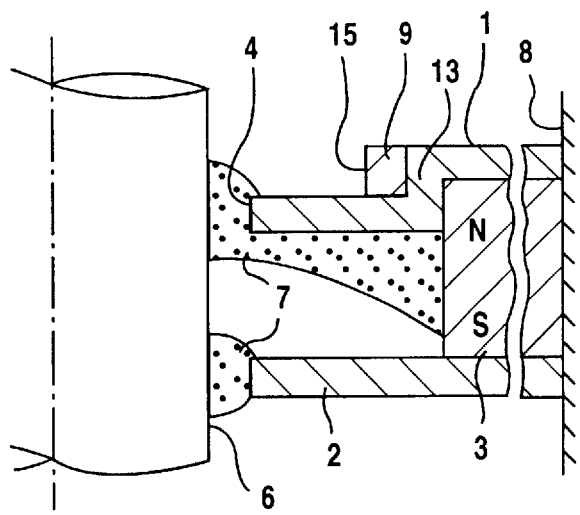
FIG. 6 is a partial sectional view of a sixth embodiment of a magnetic fluid sealing device according to the present invention.

In a sixth embodiment shown in FIG. 6, instead of the projection 9 on the pole piece 1 having the step portion 13 of FIG. 5, an oil repellent wall 15 made of the same material as that of the projection 9 of FIG. 5 is formed on the step portion 13 opposed to the rotatable shaft 6. In this embodiment, the oil repellent wall 15 serves also the function of the barrier wall 10, so that contamination of the surroundings due to flow-out and diffusion can be reliably prevented. Further, a decrease in the retained amount of the magnetic fluid 7 due to flow-out and diffusion can also be prevented.

Figure 7:
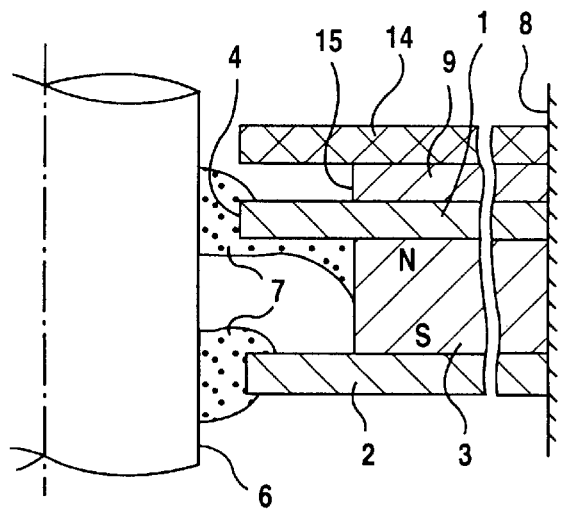
FIG. 7 is a partial sectional view of a seventh embodiment of a magnetic fluid sealing device according to the present invention.

In a seventh embodiment shown in FIG. 7, a cover 14 is attached externally of the projection 9 to cover the magnetic fluid 7 held between the front end surface 4 of the pole piece 1 and the rotatable shaft 6. In this case, the front end surface 4 of the pole piece 1, the front outer surface 14, and the barrier wall 10 form a magnetic fluid holding surface 12. In this construction, even if the held magnetic fluid 7 tries to spatter outwardly of the pole piece 1, it is prevented by the cover 14. Thus, such spattering can be reliably prevented.

Figure 8:
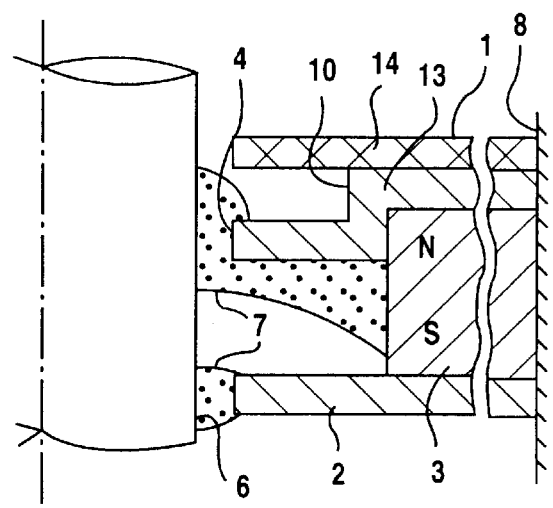
FIG. 8 is a partial sectional view of a eighth embodiment of a magnetic fluid sealing device according to the present invention.
Figure 9:
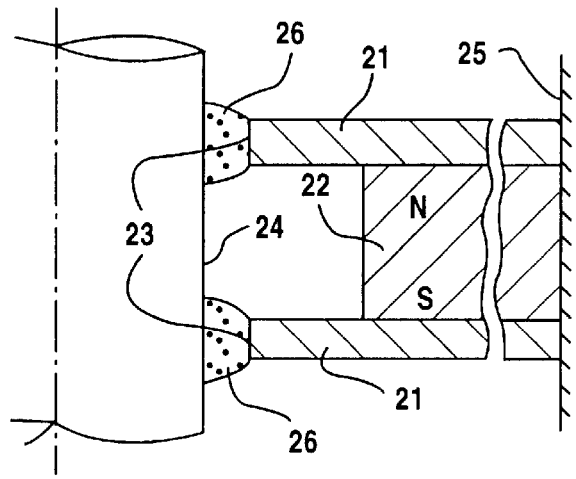
FIG. 9 is a partial sectional view of a conventional magnetic fluid sealing device.

In an eighth embodiment shown in FIG. 8, the same cover 14 as that shown in FIG. 7 is attached externally of the pole piece 1 having the step portion 13 of FIG. 1. The rest of the arrangement is the same as in the first embodiment.

Further, in the seventh or eighth embodiment, said cover 14 may be made of a material having a property such that the angle of contact of the magnetic fluid therewith is greater than that with the pole piece 1. In that case, the spattering and flow-out of the magnetic fluid 7 can be prevented more reliably.

In addition, though not shown, as another embodiment of the invention, without forming a barrier wall or an oil repellent wall, the front end surface of the pole piece may be inwardly bent to form a bent portion, with the same cover as that shown in FIG. 8 attached externally of the pole piece having said bent portion. In that case, the outer surface of the bent portion covered with the cover serves the function of a barrier wall.

In the above embodiments, formation of a barrier wall or a bent portion has been effected on only one pole piece. However, the invention is not limited thereto and it may be effected on both pole pieces. Further, the shape of the bend of the pole piece, and the shape, position of formation and relative positional relation of the oil repellent wall and barrier wall or cover are not limited to the above embodiments. The above embodiments refer to the type in which the pole pieces are fixed to the housing and the rotatable shaft opposed to the pole pieces is rotated. However, the shaft opposed to the pole pieces may be a fixed shaft rather than a rotatable shaft, while the housing to which the pole pieces are attached may be rotated. Further, in the above embodiments, the front end surfaces of the pole pieces are opposed to the rotatable shaft, but the invention is not limited thereto, and the housing may be made of magnetic material, with the outer peripheral front end surfaces of the pole pieces may be opposed to the inner peripheral surface of this housing.

What is claimed is:

1. A magnetic fluid sealing device comprising a magnet (3) held between inner surfaces of a pair of plate-like pole pieces (1, 2), a front end surface (4) of said pole piece (1) being opposed to a magnetic body (6), with magnetic fluid held between said pole piece (1) and the magnetic body (6) by a magnetic circuit formed by said magnet (3), wherein said pole piece (1) is formed with a step portion (13), said step portion (13) being positioned such that the front end surface (4) of said pole piece (1) is disposed more inwardly than the proximal end surface of said pole piece (1), the surface of said step portion (13) opposed to the magnetic body (6) serving as a barrier wall (10), wherein the angle formed between the barrier wall (10) and the outer surface of the pole piece (1) is no more than 90°.

2. A magnetic fluid sealing device as set forth in claim 1, characterized in that the angle formed between the barrier wall (10) and the outer surface of the pole piece (1) is an arcuate angle.

3. A magnetic fluid sealing device as set forth in claim 1, characterized in that said barrier wall (10) is replaced by an oil repellent wall (15).

4. A magnetic fluid sealing device as set forth in claim 1, characterized in that said pole piece (1) has a cover (14) attached thereto for covering said magnetic fluid (7) which is held.

5. A magnetic fluid sealing device as set forth in claim 4, characterized in that said cover (14) is made of a material having a property such that the angle of contact therewith is greater than that with said pole piece (1).

6. A magnetic fluid sealing device comprising a magnet (3) held between inner surfaces of a pair of plate-like pole pieces (1, 2), a front end surface (4) of said pole piece (1) being opposed to a magnetic body (6), said magnet forming a magnetic circuit by which magnetic fluid (7) is held between said pole piece (1) and said magnetic body (6), wherein an oil repellent wall (15) projecting outward from the outer surface is formed on said pole piece (1) a predetermined distance away from a distal end of said pole piece (1).

7. A magnetic fluid sealing device as set forth in claim 6, characterized in that said pole piece (1) is formed with a bent portion disposed in the vicinity of said oil repellent wall (15), and in said bent portion said front end surface (4) of said pole piece (1) is inwardly bent.

* * * * *